(12) United States Patent
Saito et al.

(10) Patent No.: US 6,567,867 B1
(45) Date of Patent: May 20, 2003

(54) INPUT DEVICE FOR INFORMATION TERMINAL

(75) Inventors: Humio Saito, Iwaki (JP); Satoshi Kodama, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/564,903

(22) Filed: May 4, 2000

(30) Foreign Application Priority Data

Jun. 11, 1999 (JP) ............................................. 11-165876

(51) Int. Cl.[7] ........................... G06F 13/00; G06F 13/14
(52) U.S. Cl. ............................. 710/58; 710/60; 710/67; 710/72; 710/73
(58) Field of Search .......................... 710/58, 60, 67, 710/72, 73

(56) References Cited

U.S. PATENT DOCUMENTS

| 4,754,326 A | | 6/1988 | Kram et al. | |
|---|---|---|---|---|
| 5,493,648 A | * | 2/1996 | Murray et al. | 345/537 |
| 5,493,726 A | * | 2/1996 | Mori | 345/473 |
| 6,157,618 A | * | 12/2000 | Boss et al. | 370/252 |
| 6,433,795 B1 | * | 8/2002 | MacNaughton et al. | 345/738 |

FOREIGN PATENT DOCUMENTS

EP 967542 A2 * 12/1999 ............ G06F/3/033

* cited by examiner

*Primary Examiner*—Jeffrey Gaffin
*Assistant Examiner*—Rehana Perveen
(74) *Attorney, Agent, or Firm*—Brinks Hofer Gilson & Lione

(57) ABSTRACT

An input device for an information terminal includes an operational experience determining device for determining the operational experience of a user in accordance with the speed of inputting data by the user to a data input screen and a display control device for changing the content on the data input screen in accordance with a result of the determination by the operational experience determining device.

20 Claims, 5 Drawing Sheets

INPUT DEVICE FOR INFORMATION TERMINAL

BACKGROUND OF THE INVENTION

1. Field of the Invention

The present invention relates to an input device for an information terminal, such as an automatic ticket vending machine installed in a station or an information retrieval terminal installed in a convenience store.

2. Description of the Related Art

Recently, various services have been offered via information terminals. For example, tickets can be routinely purchased using automatic ticket vending machines at stations, and various information services are available using information terminals installed in convenience stores and the like.

However, since the user interface of an information terminal is implemented based on specifications of venders, a person unfamiliar with the operation of an information terminal is sometimes puzzled. Although a user interface in which operations of the information terminal are explicitly explained to novices may be designed, such a user interface may be annoying to experienced users, which may reduce the utility thereof. Furthermore, since conventional information terminals only display predetermined screens in accordance with a sequence of operations, there is a sense of artificiality and coldness.

SUMMARY OF THE INVENTION

Accordingly, it is an object of the present invention to provide an easy-to-use input device for an information terminal for both inexperienced and experienced users by changing operation guidance in accordance with the level of a user's experience with the input device for the information terminal.

To this end, according to a first aspect of the present invention, there is provided an input device for an information terminal which has an operational experience determining device for determining the operational experience of a user in accordance with the speed of inputting data by the user to a data input screen; and a display control device for changing the content on the data input screen in accordance with a result of the determination by the operational experience determining device.

According to a second aspect of the present invention, an input device for an information terminal has an image display device, a data input device, and a display control device connected to the image display device and the data input device for creating images displayed on the image display device. In the input device, the display control device displays a predetermined operation guidance on the image display device when no data is input to the data input device within a predetermined period after a predetermined image is displayed on the image display device, while the display control device skips the operational guidance when data is input to the data input device within the predetermined period.

According to a second aspect of the present invention, an input device for an information terminal includes an image display device including a touch panel, a microcomputer capable of receiving one of map data and music data from a host computer by means of communication in accordance with input data from the touch panel of the image display device, and a storage medium writing device for writing one of the map data and the music data received at the microcomputer onto a storage medium.

Other and further aspects of the present invention will become apparent during the course of the following description and by reference to the accompanying drawings.

DESCRIPTION OF THE PREFERRED EMBODIMENT

An embodiment of the present invention is described below with reference to the attached drawings.

Figure 1:
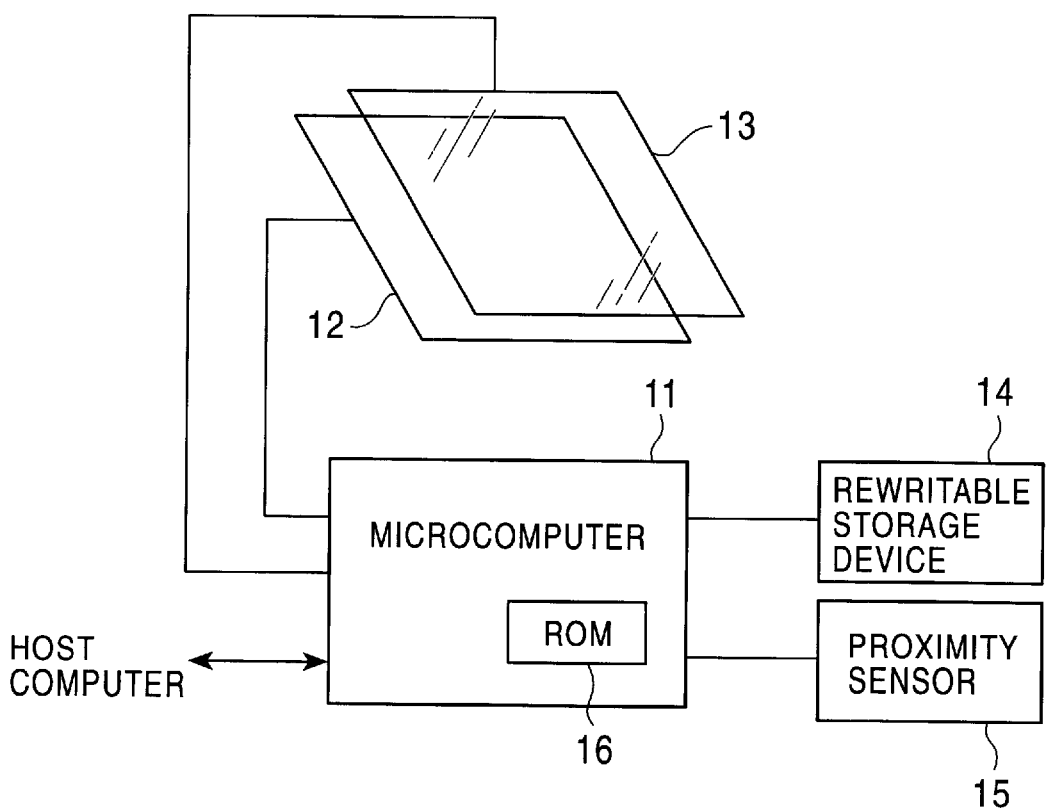
FIG. 1 is a block diagram showing a construction of an information terminal according to an embodiment of the present invention.

FIG. 1 shows the construction of an information terminal according to an embodiment of the present invention. This information terminal distributes map data or music data by writing map data for an area desired by a user or music data desired by a user onto a storage medium carried by the user. In the present embodiment, a semiconductor storage device, such as a smart card, a memory card or the like is used as the storage medium. Apart from the semiconductor storage device, a magnetic storage medium or a magneto-optical storage medium may be used as the storage medium.

By loading the storage medium having the map data into an automobile navigation device, the latest map information of the desired area can be displayed on a display of the automobile navigation device. By loading a storage medium having the music data into automobile audio equipment, desired music can be listened to in an automobile. The storage medium can repeatedly be used by deleting unwanted data because it is rewritable.

As shown in FIG. 1, the information terminal includes a microcomputer 11, a display 12 having a cathode-ray tube (CRT) and the like, a transparent touch panel 13 provided on the front of the display 12, a rewritable storage device 14, and a proximity sensor 15. The microcomputer 11 is connected via a communication line to a host computer (not shown) where data can be exchanged therebetween. Also, the microcomputer 11 has a built-in ROM (read-only memory) 16 which stores programs. In accordance with instructions of a program stored in the ROM 16, the microcomputer 11 generates an image to be displayed on the display 12 and communicates with the host computer.

When the microcomputer 11 requests a user to input data, the display 12 displays buttons in accordance with an input item. The user presses a button on the display 12 and the microcomputer 11 senses the pressed button via the touch panel 13. Data assigned to the pressed button is input to the microcomputer 11 as input data.

A storage medium is removable from the rewritable storage device 14. When a storage medium is loaded into the rewritable storage device 14 and desired data is selected by pressing an appropriate button on the display 12, the microcomputer 11 requests the host computer to send the desired data thereto. When the desired data is sent from the host computer, the rewritable storage device 14 writes the data onto the medium.

Figure 2:
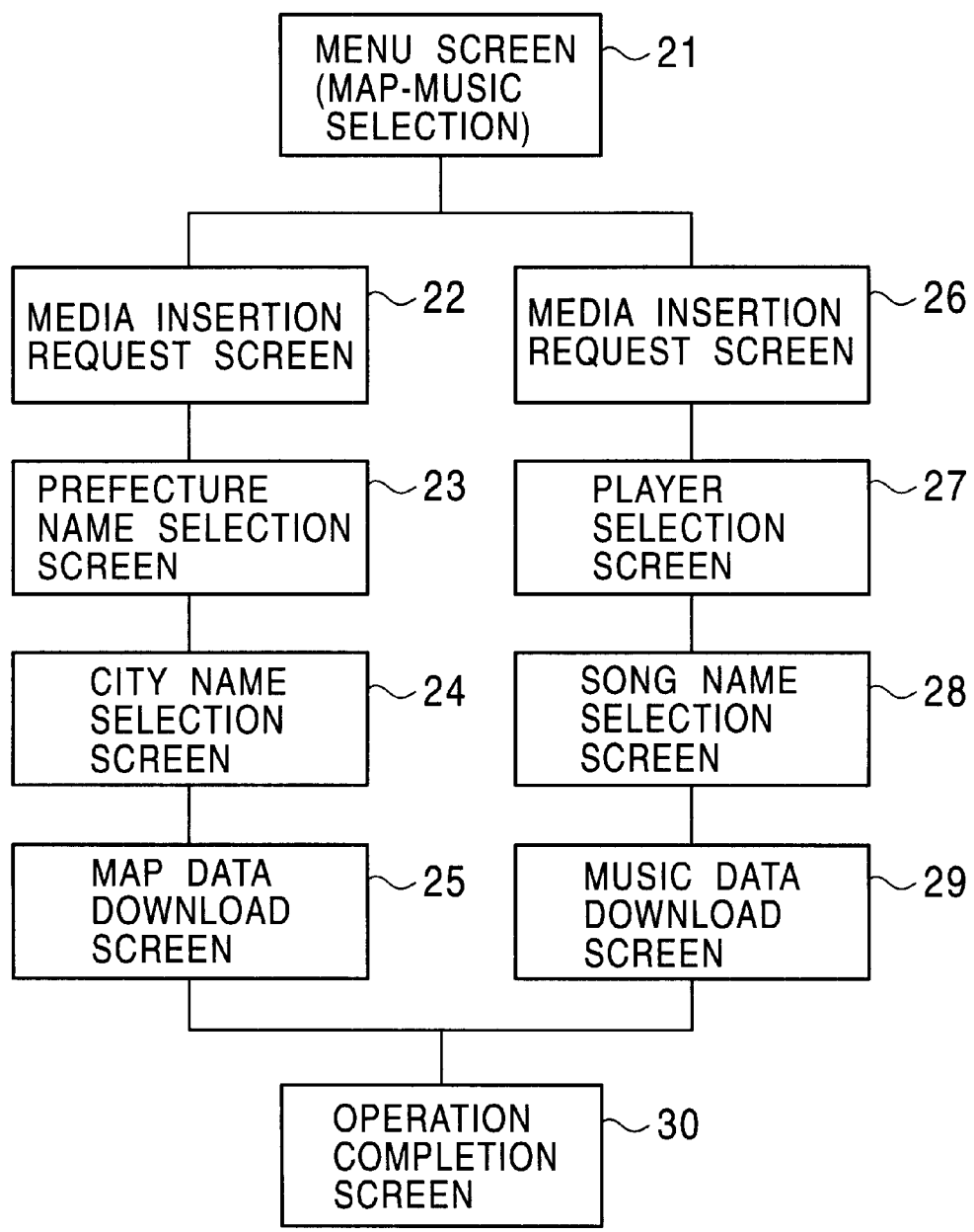
FIG. 2 is a block diagram showing the outline of the screen transition in the information terminal.

FIG. 2 shows the outline of the screen transition in the information terminal. The microcomputer 11 senses the approach of a user by the proximity switch 15 and displays "map-music selection menu" as an initial screen 21. When the user selects "map" at the initial screen 21, a medium-insertion-request-screen 22, which requests the user to load a storage medium into the rewritable storage device 14, is displayed. The user loads the storage medium into the rewritable storage device 14 and then a prefecture-name-selection-screen 23 containing a list of prefecture names is displayed. When the user selects the name of a desired prefecture from among the list of prefecture names, a city-name-selection-screen 24, which contains a list of city names corresponding to the selected prefecture, is displayed. When the user selects the name of a desired city from among the list of city names, a map-data-download-screen 25 is displayed. When the map-data-download-screen appears, map data for the selected city is downloaded from the host computer and is written onto the storage medium loaded in the rewritable storage device 14. Subsequently, an operation-completion-screen 30 is displayed. Thus, the process is completed.

When the user selects "music" at the initial screen 21, a medium-insertion-request-screen 26 which requests the user to load a storage medium into the rewritable storage device 14 is displayed. The user loads the storage medium into the rewritable storage device 14 and then a performer-selection-screen 27 containing a list of names of performers is displayed. When the user selects the name of a desired performer from among the list of performer names, a song-selection-screen 28, which contains a list of the titles of songs performed by the selected performer, is displayed. When the user selects the title of a desired song from among the listed song titles, a music-data-download-screen 29 is displayed. When the music-data-download-screen appears, music data for the selected song is downloaded from the host computer and is written onto the storage medium loaded in the rewritable storage device 14. Subsequently, the operation-completion-screen 30 is displayed, and the process ends.

Figure 3:
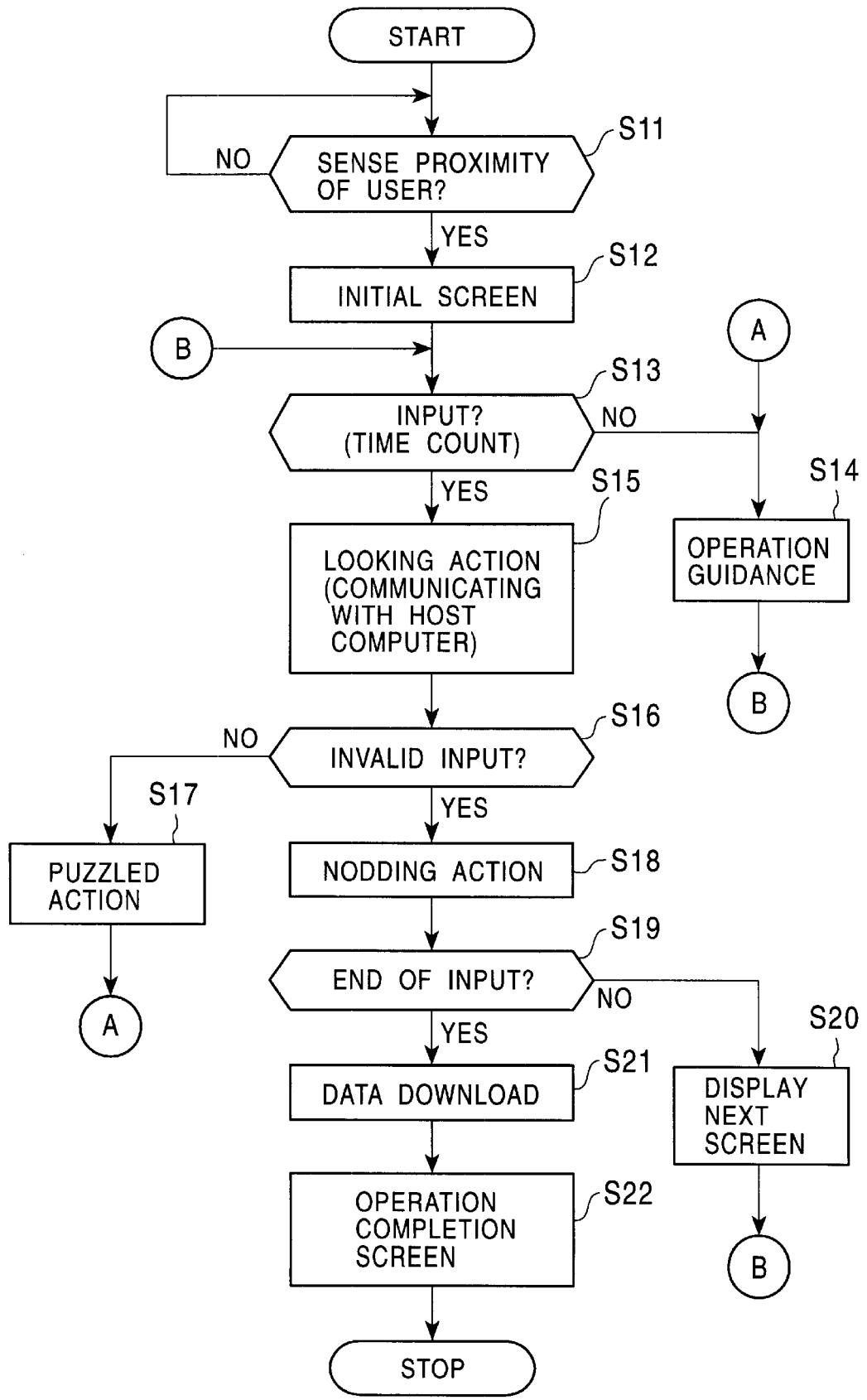
FIG. 3 is a flowchart showing the operation of the input device of the information terminal according to the present embodiment.
Figure 4:
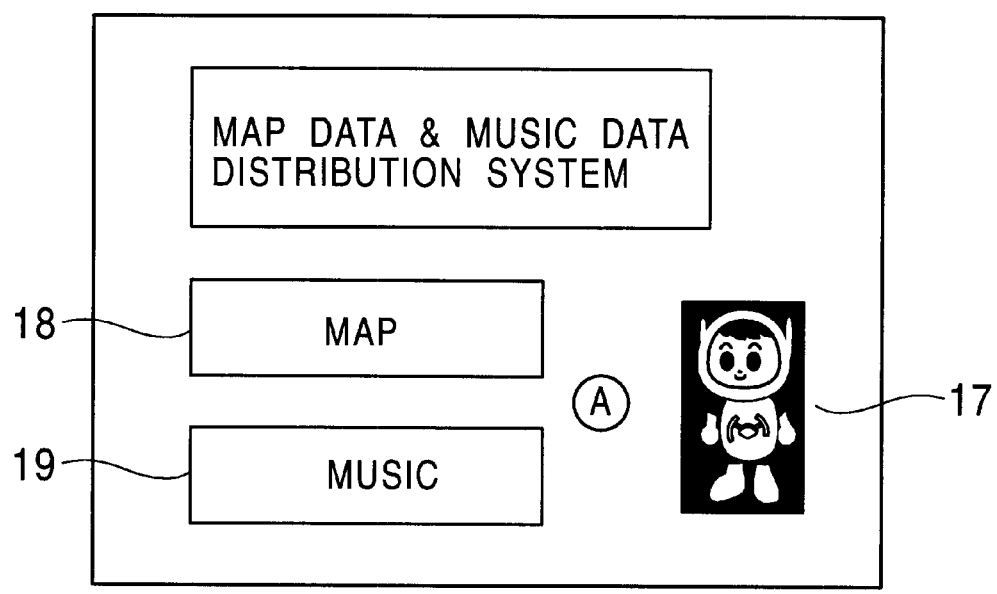
FIG. 4 is an illustration of an initial screen.

FIG. 3 shows the operation of the input device of the information terminal shown in FIG. 1. FIG. 4 shows an example of the initial screen 21. FIGS. 5A to 5D show actions of an animated character in the display 12. The animated character may be an animal or a person as long as users find it to be friendly.

At step S11, when the proximity sensor 15 senses the approach of a user, the process proceeds to step S12. At step S12, the initial screen 21 in FIG. 4 is displayed. In the initial screen 21, an animated character 17 is displayed with animated bowing while a spoken message "welcome" is generated.

The process proceeds to step S13 and determines whether or not data is input within a predetermined period, namely, whether or not a map button 18 or a music button 19 has been pressed. If data is input within the predetermined period, the process proceeds to the step S15, otherwise it proceeds to the step S14.

Figure 5A:
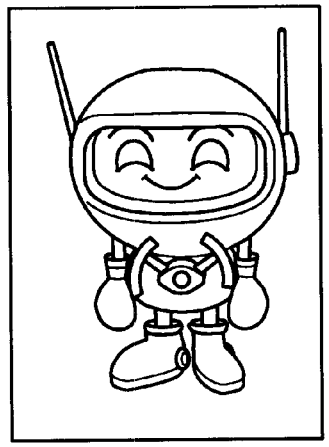
FIGS. 5A to 5D are illustrations of actions by an animated character in a display.
Figure 5B:
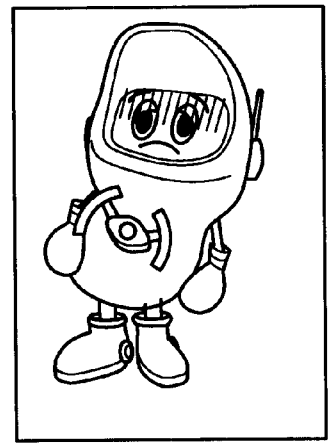
Figure 5C:
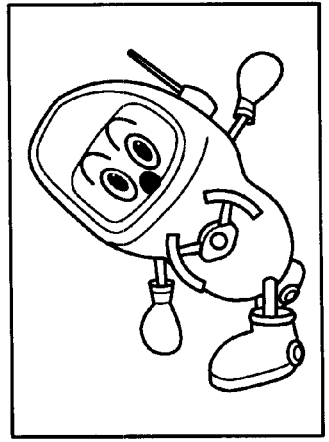

When the process proceeds to step S14, operation guidance starts by means of animation of the animated character 17. The animated character 17 moves to a point represented by "A" shown in FIG. 4. Then, for example, the animated character 17 is displayed with an animated pointing action pointing to the map button 18 as shown in FIG. 5C while a spoken message, "If you would like to download map data, please press the button labeled 'map'", is generated. Subsequently, the animated character 17 is displayed with an animated pointing action pointing to the music button 19 while a spoken message, "If you would like to download music data, please press the button labeled 'music'", is generated. Then the process proceeds to step S13. However, as soon as the map button 18 or the music button 19 is pressed, even though animation is being displayed in the middle of the above operation guidance, the process stops displaying the animation of the animated character 17 on the display 12 and proceeds to step S15.

Figure 5D:
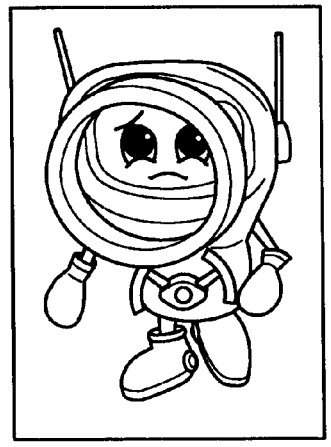

At step S15, the animated character 17 is displayed animated so as to appear to be looking at the input data through a magnifying glass, as shown in FIG. 5D. After that, the process proceeds to step S16 and determines whether or not the input data is valid. For example, when either the map button 18 or the music button 19 is pressed in the initial screen 21 shown in FIG. 4, the process determines at step S16 that the input data is valid and then proceeds to step S18. When the animated character 17 is pressed instead of the above buttons, the process determines at step S16 that the input data is invalid and then proceeds to step S17. At step S17, the animated character 17 is displayed with an animated puzzled expression as shown in FIG. 5B. Shortly thereafter, the process proceeds to step S14 where the above operation guidance starts by means of the animation of the animated character 17 while the spoken operation guidance is generated.

When the process proceeds from step S16 to step S18, in other words, when valid data is input, the animated character 17 is displayed with an animated nodding action. The process proceeds to step S19 where the process determines whether or not required data has been input. If the process determines that data input processing is not complete, the process proceeds to step S20 where the next screen is displayed. At step S20, when the next screen, for example, the performer-selection-screen 27 is displayed, the microcomputer 11 communicates with the host computer and downloads a list of performer names therefrom. The process creates the content of the performer-selection-screen 27 based on the list and proceeds to step S13 where the process determines whether or not data has been input within the predetermined period. The waiting period at step S13 may be different from the waiting period at the initial screen 21 and can be varied in accordance with the contents of the screen. Also, the waiting period may be varied in accordance with the period between when the initial screen 21 appears and when data is input to the initial screen 21.

Thus, the user sequentially inputs data into the microcomputer 11. When at step S19 the process determines that the required data has been input, the process proceeds to step S21. At step S21, the microcomputer 11 downloads map data of the desired area or music data of the desired song from the host computer. The rewritable storage device 14 writes the downloaded data onto the loaded storage medium therein. In the operation-completion-screen 30, the animated character 17 is displayed with an animated bowing action while a spoken message "thank you" is generated. Finally, the series of operations for the information terminal is completed.

In the embodiment of the present invention, the process determines whether or not operation guidance processing (animation and voice output) should be skipped in accordance with the experience of the user, in other words, the period between when a data input screen appears and when a button is pressed. Accordingly, since experienced users can skip unnecessary processing, such as the operational guidance and the spoken guidance, and can input data into the microcomputer 11 quickly, favorable usability is realized. On the other hand, since inexperienced users can be aided by the operation guidance of the animated character 17 as well as the spoken guidance, even absolute novices to terminals can comfortably handle the input device for the information terminal.

Furthermore, in the embodiment of the present invention, when a user inputs valid data, the animated character 17 is displayed animated to be smiling or nodding. When the user inputs invalid data, the animated character 17 is displayed animated with a puzzled expression. Accordingly, these animations intuitively convey to the user whether or not the input data is valid, and also convey to the user a sense of friendliness from the animated character 17, which may lessen the operational difficulties of the user.

What is claimed is:

1. An input device for an information terminal comprising:

operational experience determining means for determining the operational experience of a user in accordance with the speed of inputting data by the user to a data input screen; and display control means for changing the content on said data input screen in accordance with a result of the determination by said operational experience determining means.

2. An input device for an information terminal according to claim 1, wherein said operational experience determining means determines that the user is inexperienced when no data is input to said data input screen within a predetermined period of time after the data input screen is displayed.

3. An input device for an information terminal according to claim 1, wherein said display control means displays a predetermined operation guidance on said data input screen and/or outputs spoken operation guidance when said operational experience determining means determines that the user is an inexperienced operator.

4. An input device for an information terminal according to claim 3, wherein said display control means skips at least a part of said operation guidance when said operational experience determining means determines that the user is an experienced operator.

5. An input device for an information terminal according to claim 1, wherein said display control means displays, on an image display means, a predetermined animated guidance character which changes expression or action in accordance with validity or content of input data.

6. An input device for an information terminal according to claim 5, wherein said predetermined guidance character is displayed with an action of looking through a magnifying glass at input data based on a predetermined condition.

7. An input device for an information terminal according to claim 5, wherein said predetermined animated guidance character is displayed with a puzzled expression when invalid data is input.

8. An input device for an information terminal according to claim 5, wherein said predetermined animated guidance character is displayed with a nodding action when valid data is input.

9. An input device for an information terminal according to claim 1, wherein said information terminal receives one of map data and music data.

10. An input device for an information terminal according to claim 1, further comprising a proximity sensor for sensing the approach of the user, wherein a predetermined initial screen is displayed when said proximity sensor senses the approach of the user.

11. An input device for an information terminal according to claim 10, wherein a predetermined animated guidance character is displayed on said initial screen.

12. An input device for an information terminal comprising:

image display means;

data input means; and display control means, connected to said image display means and said data input means, for creating images displayed on said image display means;

wherein said display control means displays a predetermined operation guidance on said image display means when no data is input to said data input means within a predetermined period of time after a predetermined image is displayed on said image display means while said display control means skips said operational guidance when data is input to said data input means within said predetermined time period.

13. An input device for an information terminal according to claim 12, wherein said data input means comprises a touch panel.

14. An input device for an information terminal comprising:

image display means having a touch panel for data input;

a microcomputer capable of receiving one of map data and music data from a host computer by means of communication in accordance with input data from the touch panel of said image display means;

storage medium writing means for writing one of said map data and said music data received at said microcomputer onto a storage medium; and display control means, connected to said image display means and said touch panel, for creating images displayed on said image display means, wherein said display control means displays a predetermined operational guidance on said image display means when no data is input to said touch panel within a predetermined period of time after a predetermined image is displayed on said image display means, while said display control means skips said operational guidance when data is input to said touch panel within said predetermined time period.

15. An input device for an information terminal according to claim 14, wherein said microcomputer displays, on said image display means, a predetermined animated guidance character which changes expression or action in accordance with validity or content of input data.

16. An input device for an information terminal according to claim 15, wherein said predetermined animated guidance character is displayed with an action of looking through a magnifying glass at input data based on a predetermined condition.

17. An input device for an information terminal according to claim 15, wherein said predetermined animated guidance character is displayed with a puzzled expression when invalid data is input.

18. An input device for an information terminal according to claim 15, wherein said predetermined animated guidance character is displayed with a nodding action when valid data is input.

19. An input device for an information terminal according to claim 14, further comprising a proximity sensor for sensing the approach of a user, wherein a predetermined initial screen is displayed when said proximity sensor senses the approach of the user.

20. An input device for an information terminal according to claim 19, wherein said predetermined animated guidance character is displayed on said initial screen.

* * * * *